(12) United States Patent
Weiss et al.

(10) Patent No.: US 6,949,160 B2
(45) Date of Patent: Sep. 27, 2005

(54) REMOVABLE PROTECTIVE COATING METHOD AND APPARATUS

(75) Inventors: Christopher H. Weiss, Blaine, WA (US); Michael G. Weiss, Walkerton, IN (US); Harley L. Weiss, North Liberty, IN (US); Marek J. Gnatowski, Coquitlam (CA); Andrew Koutsandreas, Vancouver (CA)

(73) Assignee: Weiss Prestaining, Inc., LaPorte, IN (US)

( * ) Notice: Subject to any disclaimer, the term of this patent is extended or adjusted under 35 U.S.C. 154(b) by 0 days.

(21) Appl. No.: 10/159,897

(22) Filed: May 30, 2002

(65) Prior Publication Data

US 2002/0195191 A1 Dec. 26, 2002

Related U.S. Application Data

(60) Provisional application No. 60/295,203, filed on May 31, 2001.

(51) Int. Cl.[7] .............................................. B32B 31/00
(52) U.S. Cl. ........................ 156/247; 156/349; 427/440
(58) Field of Search ................................ 156/247, 349; 427/440

(56) References Cited

U.S. PATENT DOCUMENTS

| | | | |
|---|---|---|---|
| 2,611,153 A | 9/1952 | Semegen | |
| 4,636,543 A | 1/1987 | Helton | |
| 5,070,121 A | 12/1991 | Hinterwaldner et al. | |
| 5,143,949 A | 9/1992 | Grogan et al. | |
| 5,273,787 A | 12/1993 | Gnatowski | |
| 5,326,520 A | 7/1994 | Franck et al. | |
| 5,573,812 A | 11/1996 | Moy | |
| 5,919,537 A | 7/1999 | Niazy | |
| 6,083,335 A | * 7/2000 | Scullin et al. | ............... 156/196 |
| 6,110,525 A | 8/2000 | Stoddard | |
| 6,124,044 A | 9/2000 | Swidler | |
| 6,159,404 A | 12/2000 | Edwards et al. | |
| 6,187,377 B1 | 2/2001 | Tojo et al. | |
| 6,187,386 B1 | 2/2001 | Hundley | |
| 6,254,712 B1 | * 7/2001 | Enlow et al. | ........... 156/244.11 |
| 2001/0052385 A1 | * 12/2001 | Enlow et al. | ........... 156/244.11 |
| 2002/0157772 A1 | * 10/2002 | Enlow et al. | ................ 156/238 |

FOREIGN PATENT DOCUMENTS

EP 0 888 908 A2 1/1999

* cited by examiner

Primary Examiner—Leszek B Kiliman
(74) Attorney, Agent, or Firm—Robert B. Hughes; Hughes Law Firm, PLLC

(57) ABSTRACT

Extrusion coating of a removable thermoplastic material onto freshly painted (non-fully cured paint) surfaces has been found to be an effective method for providing protection against damage during handling, and blocking during stacking, enabling handling of the substrate shortly after painting. Furthermore, the extrusion coating allows the paint to dry and cure on porous and non-porous substrates.

21 Claims, 8 Drawing Sheets

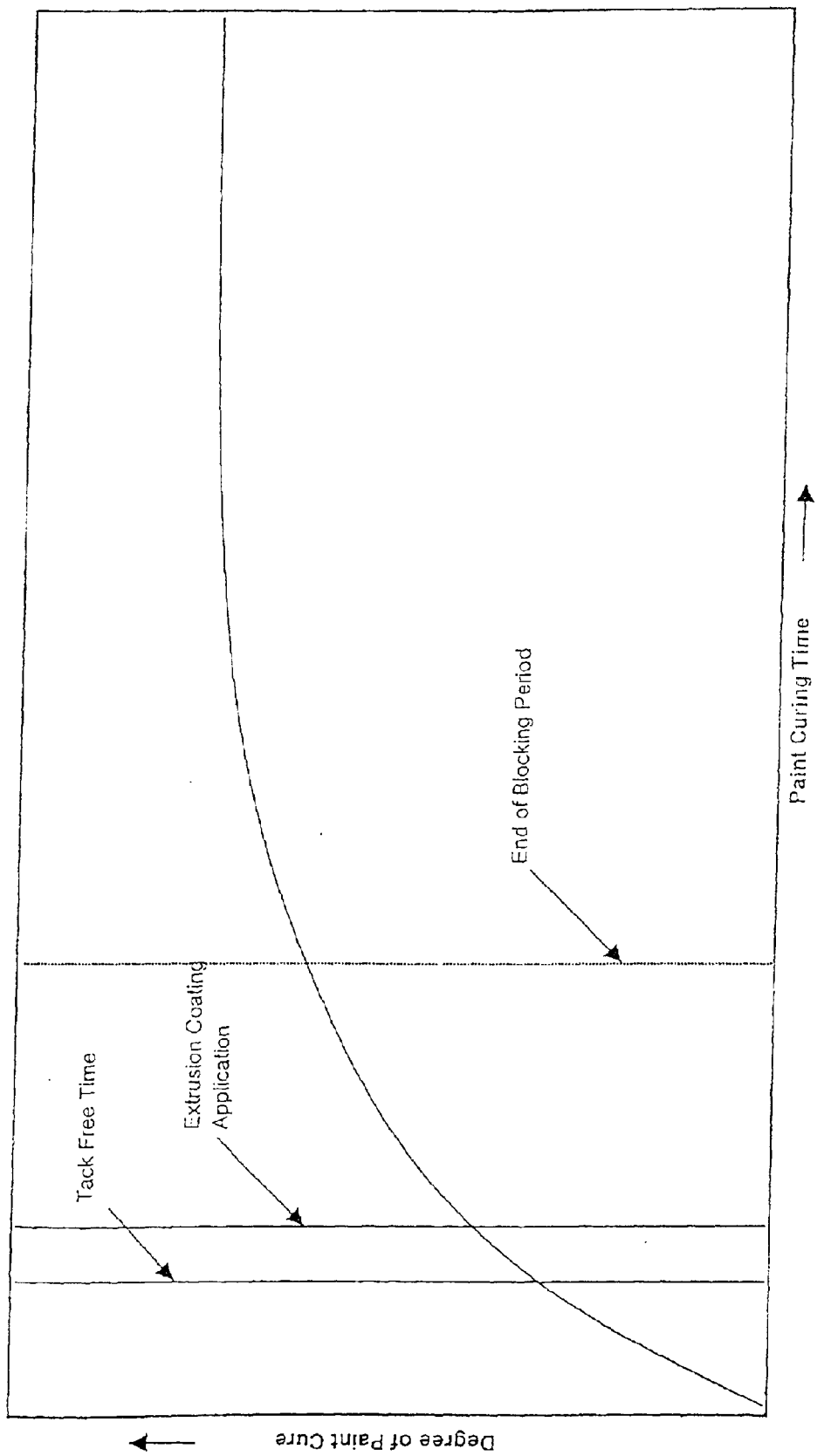

Fig. 8

Table 1. Adhesion of Films Extrusion Applied onto Painted Hardie Boards Coated with Valpro Acrylic Latex Paint

| Adhesion Promoter* | Peel Adhesion Strength (N/m) | | | | | 50/50 LDPE/Metallocene |
|---|---|---|---|---|---|---|
| | LDPE | LEDPE | HDPE | PP | Metallocene | |
| Piccopale 100 | 10.4 | 1.2 | 0 | 1.6 | 27.2 | - |
| Wingtack 95 | 7.6 | - | - | - | - | 8.8 |
| Sylvares TR1135 | 30.0 | - | - | - | - | 18.8 |
| Eastotac H130U | 16.8 | - | - | - | - | 8.4 |
| Bynel 2002 | 0 | - | - | - | - | - |
| Bynel 2174 | 0 | - | - | - | - | - |
| None | 0 | 0 | 0 | 0 | 0 | 0 |

*Adhesion promoter added at 10% of total weight of resin and promoter

Fig. 9

Table 2. Properties of LDPE with Addition of Tackifiers

| Tackifier Added | Tensile Strength (MPa) | Strength Retained (%) | Elongation at Break (%) | Elongation Retained (%) | Wear (mg) |
|---|---|---|---|---|---|
| None | 16.1 | - | 577 | - | 29 |
| Piccopale 100 | 11.9 | 74 | 426 | 74 | 26 |
| Wingtack 95 | 13.4 | 83 | 521 | 90 | - |
| Sylvares TR1135 | 11.9 | 74 | 466 | 81 | - |
| Eastotac H130U | 11.9 | 74 | 463 | 80 | 29 |

[1]Tackifier added at 10% by weight to LDPE
[2]Tensile strength and elongation tested according to ASTM D882
[3]Wear tested according to ASTM D4060 (300 cycles, H18 wheel, 1 kg weight)

Fig. 10

Table 3. Abrasion of Extrusion Coated Versus Non-Extrusion Coated Painted Surfaces

| Substrate | Paint Type | Extrusion Coated | Wear (mg) Over Time Hours | | | | | | | |
|---|---|---|---|---|---|---|---|---|---|---|
| | | | 0.25 | 1 | 3 | 24 | 96 | 168 | 336 | 504 |
| Fibre/Cement | Latex | None | 52 | - | - | 17.5 | 14 | 13.5 | 15 | - |
| Fibre/Cement | Latex | LDPE | 52 | - | - | 47.5 | 15 | 24.5 | 19.5 | 19 |
| Pine | Latex | None | - | 49.5 | 37 | 31 | - | 18.5 | 16.5 | - |
| Pine | Latex | LDPE | - | 49.5 | - | 27 | 25.5 | 23.5 | 21.5 | - |
| Pine | Latex | Saran | - | 49.5 | - | 30.5 | 25.0 | 25.5 | 22.5 | - |
| Pine | Latex | Polystyrene | - | 49.5 | - | 28.5 | 23.5 | - | - | - |
| Fibre/Cement | Alkyd | None | - | 97.5 | - | 111.5 | 76 | 54.5 | 24.5 | - |
| Fibre/Cement | Alkyd | LDPE | | 97.5 | - | 179 | 67.5 | 66.5 | 27 | |
| Aluminium | Latex | None | - | 59.5 | 42.5 | 20.5 | - | 19 | 17 | - |
| Aluminium | Latex | LDPE | - | 59.5 | - | 52.5 | - | 48 | - | - |

Fig. 11

Table 4. Blocking of Extrusion Film Coated and Unprotected Painted Surfaces

| Substrate | Paint Type | Extrusion Coated | Tack Free Time (hrs) | Blocking Hours | | | | |
|---|---|---|---|---|---|---|---|---|
| | | | | 0.5 | 1 | 1.5 | 2 | 4 | 16 |
| Fibre/Cement | Alkyd | None | 1 | - | Yes | - | - | Yes | No |
| Fibre/Cement | Alkyd | LDPE | 1 | - | No | - | - | No | No |
| Fibre/Cement | Latex | None | 0.25 | Yes | Yes | Yes | Yes | - | - |
| Fibre/Cement | Latex | LDPE | 0.25 | No | No | No | No | - | - |
| Pine | Latex | None | 1 | Yes | Yes | Yes | Yes | - | - |
| Pine | Latex | LDPE | 1 | No | No | No | No | - | - |
| Pine | Alkyd | None | 4 | - | Yes | - | Yes | Yes | Yes |
| Pine | Alkyd | LDPE | 4 | - | No | - | No | No | No |

Fig. 12

Table 5. Gloss and Colour Changes for Painted Substrate Unprotected and Protected by Extrusion Coated Film

| Substrate | Paint Type | Extrusion Coated | Slip Sheet | Gloss 60° | | Colour Shift Delta E | |
|---|---|---|---|---|---|---|---|
| | | | | 1 day | 7 day | 1 day | 7 day |
| Pine | Latex | LDPE | No | 2.2 | 2.1 | 0.24 | 0.16 |
| Pine | Latex | None | Yes | - | 1.9 | - | 0 |
| Pine | Latex | None | No | 2.0 | 1.9 | 0.20 | 0.28 |

Fig. 13

Table 6.

| Substrate | Paint Type | Extrusion Coated | Gloss 60° (4 day) | Colour Shift Delta E (4 day) |
|---|---|---|---|---|
| Fibre-Cement | Alkyd | Yes | 1.30 | 0.72 |
| Fibre-Cement | Alkyd | No | 1.35 | 0.27 |

REMOVABLE PROTECTIVE COATING METHOD AND APPARATUS

RELATED APPLICATIONS

This application claims priority benefit of U.S. Ser. No. 60/295,203, filed May 31, 2001.

BACKGROUND OF THE INVENTION a) Field of the Invention

The present invention relates to the protection of painted surfaces, and more particularly to freshly painted surfaces, by the application of a removable plastic film coating. The present invention is well adapted for use in, for example, applying the protective coating to prepainted members, such as panels, boards or the like used in the construction industry.

b) Background Art

There are various situations and/or industrial applications where the surface of various items are pre-painted and then shipped to another location where they are further handled or utilized in some manner, such as making a structure of the like. For example, in the building industry, in many instances wooden boards or planks (e.g., used as siding) are pre-painted and then shipped to the job site where these are used in the construction of the house, building, etc. Because of the nature of the painted surface, certain precautions must be taken in the manner in which these panels are shipped and also used at the location where they are applied to the building structure. Even though a month, or even a year, has passed after the paint has been applied and has cured, if a number of these panels are stacked directly one on top of the other, the painted surfaces of these boards could be damaged. This could occur when there is a combination of pressure and possibly higher temperature, causing the painted surface to stick to the adjacent panel and disfigure the painted surface. A further problem is that in shipment, these panels could be jostled so that there is relative movement between the panels, and this sliding could cause some scratching of the painted surface.

Accordingly, a common prior art method in preparing these panels for shipment is to place between each pair of adjacent panels an intervening layer of a foam plastic material which has surface characteristics so that it will not bond to the painted surface. After a number of panels have been stacked one on top of the other with the foam plastic layers in-between, several ribbons are wrapped around the stack to hold the panels together. Alternatively, instead of using a foam plastic material, a slip sheet (i.e., a plastic non-foam sheet) could be used to provide the separations. To the best knowledge of the applicants, there has not been found a practical way to automate this particular process of stacking the panels with intervening plastic sheets and tying these together for shipment. Thus, it is commonly done manually.

A further problem is that after the panels are shipped to the building site, when the painted panels are removed from the stack, these can be jostled against one another, or against some other object, to cause damage to the painted surface. Or the surface of the panels could be slid over one another causing scratching.

A search of the patent literature has disclosed a number of patents, these being the following:

U.S. Pat. No. 6,159,404 discloses an extrusion coating method for coating of substrates with a film which comprises polyethylene resin and tackifier. The method also requires inclusion of a hygroscopic or hydrophilic additive and is intended as a permanent coating.

European Patent Application 888,908 describes an extrusion coating method for wood substrates which comprises tackified polyolefin resin extrusion coated onto wood substrates to provide a decorative permanent finish, and there is the addition of a second mar resistant layer.

U.S. Pat. No. 6,187,386 (Hundley), discloses an aqueous composition that has a function to prevent water loss during the curing of cement. The composition comprises 5–45% of a wax hydrocarbon substance, 1–10% of polyvinyl alcohol, and additionally an optional biocide, and finally the remaining ingredient is water.

U.S. Pat. No. 6,124,044 describes a method for applying a removable protective film, where the protective film is applied as an emulsion.

U.S. Pat. No. 6,187,377 (Tojo et al.), discloses a suitable paint that is poured onto coated surfaces and a method of application of the composition. In general, the temporary protective coating for the automobile V is applied at station Sd and a spreading station Sa disburses the temporary protective coating over the surface. As described in column 8, lines 45 and following, the paint 18 is poured in a zigzag manner through the nozzles 10 (see FIG. 1). Pressurized air helps disburses the coating more evenly. As shown in FIG. 9, there is a second embodiment where roller 25 is used to disperse the temporary coating evenly.

U.S. Pat. No. 6,110,525 (Stoddard), discloses a coating composition that forms a peelable coating for protecting surfaces from outside elements. The coating has a property of being an ultraviolet absorber and is primarily composed of rubber. In column 5, lines 12–17, the suitable areas of use for the composition are presented.

The description of the preferred embodiment discloses the preferred composition where the rubber particles are in the range from 35–50 percent and the properties are listed in column 2, lines 47–57. Styrene butadiene rubber is a preferred type of rubber used. The other ingredients included in the composition are a UV absorber, antioxidants, pH stabilizers, waxes, defoamers, thixotropic agents and leveling agents.

U.S. Pat. No. 5,573,812 (Moy), discloses a multi layer composite coating compositions. There is a first coat that comprises a film forming composition that can cure or dry. A subsequent coat, or coatings, is or are applied.

U.S. Pat. No. 5,273,787 (Gnatowski), discloses a protective coating, which is a sealer coating containing cyclic epoxy and an anhydride that are adapted to bind to the lignin and cellulose in the wood. After this, the protective coating has a UV protectant is applied thereto.

U.S. Pat. No. 5,143,949 (Grogan et al.), discloses a coating composition for temporary protective coatings adapted to be applied to a variety of surfaces. The composition can be washed off with water.

U.S. Pat. No. 5,070,121 (Hinterwaldner et al.), discloses a solvent free, low monitor, polymerizable pardonable hot melt composition for coating metal, plastic, cellulose and, inorganic material.

U.S. Pat. No. 4,636,543 (Helton), discloses a composition solution that relates to a temporary protective coating used for glass, metal, and nonporous painted surfaces, and is also useful for preventing insect invasion. As disclosed in column 2, line 31–39 the composition comprises generally vinyl chloride resin, a release agent, plasticizers, ketone, and aromatics.

U.S. Pat. No. 4,016,312 (Luthardt), discloses a method of coating a cellulosic substrate with a polymer coating.

U.S. Pat. No. 2,611,153 (Semegen), discloses a composition for a temporary protective coating for rubber, wood, metal, etc. As disclosed in column 1, lines 9–12, the composition can be removed by peeling the layer from the coated surface.

SUMMARY OF THE INVENTION

The present invention provides an efficient, cost effective, and reliable system by which a protective film is applied to a painted surface, and more particularly, to a freshly painted surface of a substrate to provide a protective coating that reliably adheres to the surface of the substrate and can easily be removed at a later time. Further, this is done in a manner that the character and "integrity" of the painted surface is maintained with regard to such characteristics as of gloss, color, etc. Further, during the time period in which the protected coating remains on the painted surface of the substrate, the paint is able to cure properly.

Thus, the present invention lends itself to being advantageously used in a variety of industrial applications, such as, for example, the building industry where boards or panels are prepainted at a manufacturing location and later shipped to a use location where these boards or panels are used in constructing a house or other building structure. The boards, with the protective coating, can easily be stacked one on top of the other, and with the painted surfaces being covered, there is no sticking of adjacent panels to one another. Thus, the stack of panels can be secured by ribbons or cords, and then the stack can be shipped for storage or to a use location, such as a building site. Then, the boards can be taken from the stack with the protective coatings still on the panels, handled in various ways, and used in constructing a house.

For example, if these are siding boards, each board with a protective coating still on the board can be taken to the location where it is to be nailed to the wall, and the protective plastic coating can be removed prior to nailing the board in place.

Alternatively, the board with the protective coating still on it, could be partially nailed in place, such as driving only a couple of nails far enough into the boards so that it is properly placed, but with the heads of the nails not flush against the surface of the board. Then the protective film could be stripped away, and the nailing then be completed.

Another advantage of the present invention is that it is readily adapted to be used in an automated production line. In one embodiment that is described in detail herein, the protective plastic film is applied to individual panels which are spaced from one another and move sequentially through the operating area. Thus, when these panels leave the production line with the protective coatings, applied thereto, they can immediately be stacked one on top of the other as described above, thus alleviating many of the inefficiencies which are inherent in the common prior art method as described in the section "Background Art".

Alternatively, the film could be applied in a continuous manner to a substrate which is directed continuously through the operating area where the film is supplied. Or, separate panels placed end to end and immediately adjacent to one another, could have the film applied thereto, with the film being then separated at the adjacent edges of the boards or the boards or other items could be handled separately in applying the protective film.

Further, the fact that the thermoplastic film can be applied shortly after the paint is tack-free (or possibly a moderately longer time) results in a substantial savings of production time, particularly when (in a commercial operation) the paint would be forced dried (i.e., in an oven or some other manner) so that the tack-free surface could be developed more quickly.

Basically, the method of the present invention is to apply a removable, protective film over a fresh coat of paint that has been applied to a surface of a substrate. The method comprises first providing a substrate having a substrate surface on which there is a coat of paint that is a fresh coat of paint that has a tack-free surface.

There is then applied a hot film of a thermoplastic polymeric material to the tack-free surface of the coat of paint, with temperature of the film being sufficiently high so that the film is able to conform to the tack-free surface of the coat of paint. Then the film is cooled so that the film hardens to adhere to the surface of the coat of paint as a protective film covering the surface of the coat of paint.

The thermoplastic material is characterized by having adhesion characteristics such that with the protective film having been applied to the coat of paint, has a level of adhesion in a range that is sufficiently high to adhere to the surface of the coat of paint as a protective layer, but is at a later time able to be peeled from the surface of the coat of paint.

Thus, the substrate is able to have the surface of the coat of paint protected for a protected period of time, where the substrate is in a situation or situations during which protection for the surface of the coat of paint is needed, and the substrate is able to have the protective film removed subsequent to said protected period of time.

With the coat of paint being a freshly applied coat of paint which during curing emits volatiles, there is provided gas or vapor permeability for the coat of paint. This permeability can be provided by providing the substrate (which can be panels) as being of a material which is gas permeable, providing the protective film as a film that is a gas permeable protective film, or by a combination of these. More specifically in some preferred embodiments, the permeable substrate or panel is made of wood, or a wood/cementious material or a combination of wood and wood/cementious material.

In a preferred form, the protective film after being applied to the panel, is between about 1 mil. to 20 mil. in thickness. A narrower range is between 2 to 10 mils. In thickness. In a preferred form, the protective film is no greater than about 5 mil. in thickness.

In a preferred form, the protective film that is applied to the panel has adhesion characteristics such that with the protective film having been applied to the paint surface, at a later time when the protective film is to be removed, the protective film has a level of adhesion strength in a range that is at a lower level in said range the adhesion range is sufficient to enable the protective film to adhere to the coat of paint as a protective layer, and at the higher level in the range the protective film is able to be peeled from the surface of the coat of paint. In the preferred form, the adhesion strength can be between about 5 to 50 Newtons per meter with a more narrow range being between about 10 to 30 Newtons per meter, and a desired range being no greater than about 20 Newtons per meter.

Also, the protective film should have a sufficiently high tensile strength relative to the adhesion strength of the film so that the protective film can be peeled from the panel in a strip or strips.

Also, the film should be sufficiently hot so that when it is extruded onto to the substrate, the film is at a sufficiently high temperature so that it will conform to the surface of the paint, and not so high as to cause damage to the coat of paint. Temperatures of 200° C. to 240° C. have been found to be satisfactory. In general, the range of temperature of the film as it is being applied to the substrate could be between about 100° C. to 320° C., with a more limited range being between 140° C. to 290° C. and a yet more limited range being between 170° C. to 260° C., will temperature at or between about 200° C. being satisfactory.

There are a number of thermoplastic polymers which have been found to be suitable for use in the present invention, and these comprise polyolefin resins, (including low density polyethylene, linear low density polyethylene, metallocene polyethylene), vinylidene chloride/vinylchloride copolymer, modified polystyrene, and combinations thereof. More specifically, it has been found desirable that the thermoplastic material could advantageously being comprised at least in part a polyolefin.

As indicated earlier, in one preferred embodiment the protective film is applied to a plurality of panels, each having an upper surface, and with these panels being spaced from one another and passing sequentially through an operating region on a rear to front travel path through the operating region.

It is to be understood that the term "panel" in interpreting the scope of the present invention and the claims is not, within the broader range meant to include only substrates which are within the more limited dictionary definition of a panel (i.e. a rectangular wood board). Rather, the terms "panel" is intended to apply to other substrates of different materials and shapes which are adapted to have a pre-painted surface and need to have a protective film applied to a surface.

This apparatus comprises an extrusion die apparatus which is positioned within the operating region and above the travel path of the panels. From this die apparatus there is extruded a protective film downwardly toward the travel path of the panels. There is a catch section positioned below the travel path to receive the protective film from the extrusion die apparatus in a manner that extends from the die apparatus through a film-engaging location on the travel path, and to the catch section.

This accomplished in a manner that a front end of the panel traveling in a forward direction on the path of travel engages a film engaging portion of the intermediate film portion at the film-engaging location. This intermediate film portion has upper and lower intermediate film portions above and below, respectively, the film-engaging location.

There is a compression member which is within the operating region and is positioned to engage the upper intermediate film portion and press the film against the upper surface of the panel as the panel is traveling through the operating region.

Then there is a separating section that makes a separation of the upper and lower intermediate film portions.

In a preferred form, the compression section comprises a compression roller having a compression roller surface to engage the film. The compression roller is positioned forwardly of a nozzle location of the extrusion die apparatus from which the film is discharged downwardly. As the forward end of the panel is moving forwardly, it carries the upper intermediate film portion from the extrusion die nozzle in a forward direction to a location beneath the compression roller. The compression roller then engages the upper intermediate portion of the film. In approximately that same time frame, the separating section engages the lower intermediate film portion below and approximately at the same forward location of the compression roller to make the separation of the lower intermediate portion from the upper intermediate film portion. In one preferred form, the separating section comprises a separating member which engages the lower intermediate film portion and pulls the intermediate film portion in a rearward direction. More specifically, the separating member in a specific configuration is a separating roller which has a roller surface portion engaging the lower intermediate surface portion to pull the lower intermediate portion rearwardly. In a preferred form, the separating roller has a metal surface (e.g. stainless steel, galvanized). Within the broader scope, other severing devices could be used, and such severing devices would desirably be arranged to engage the lower intermediate film portion and pull the intermediate film portion in a rearward direction.

The apparatus is arranged so that as the board continues moving on a forward path of travel, and a rear end portion of the board reaches a location where the compression roller and the separating member are located, the compression roller and the separating member have relative movement toward one another to engage a portion of the film at the rear end portion of the panel to separate the film at a location rearwardly of the rear end portion of the panel.

Other features of the present invention will become apparent from the following detailed description.

BRIEF DESCRIPTION OF THE DRAWINGS

FIG. 7: is a graph plotting rate of cure against time to illustrate certain features of the present invention; and FIGS. 8–13: show Tables 1 through 6 which illustrate certain characteristics or relationships in the present invention.

DETAILED DESCRIPTION OF THE PREFERRED EMBODIMENTS

It is believed that a clearer understanding of the present invention will be obtained by describing the invention in the following sequence. First, with reference to FIG. 1 and FIG. 7, there will be a description of the basic process of applying the protective film coating to the substrate where the protective film coating is applied over the freshly painted layer of paint, followed by a general description of the processing steps and various features of the present invention. Second, there will be a more detailed description of the film material and characteristics of the same, followed by a number of examples relating to same. Third, with reference to FIGS. 2–6, there will be a description of the apparatus by which this coating process is accomplished and also further details of the present invention.

a) General Description of the Present Invention

Figure 1:
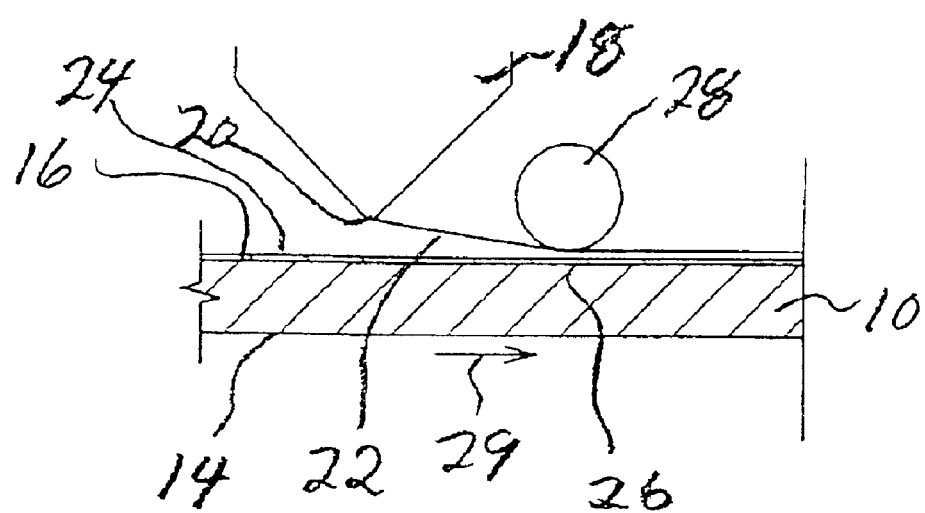
FIG. 1: somewhat schematic side elevational view illustrating the basic process of the present invention.

With reference to FIG. 1, there is shown a substrate 10 having upper and lower surfaces 12 and 14. The upper surface 12 has just recently been covered with a coating of paint 16 which is tack-free but not fully cured.

A lower-end portion 18 of an extrusion die apparatus 19 is shown discharging through a slot-like nozzle 20 a high temperature plastic film 22 downwardly toward the upper surface 24 of the paint layer 16. As the film 22 is coming into contact with the surface 24, as indicated at 26, a compression force is being applied against the film at 26, this being conveniently accomplished by a compression roller indicated at 28.

As shown in FIG. 1, there is relative movement of the substrate 10 with respect to the extrusion die apparatus and the compression roller 28, indicated by the arrow 29, as the film layer is deposited. In the following description of the invention, for convenience of description, the substrate 10 will be considered as being a wood board or panel (e.g., wood siding), or possibly a wood cementitious board. Thus, in the following text the substrate 10 will simply be referred to as the "board" or the "board siding" which is to be installed as siding along the side of a home. However, within the broader scope of the present invention, other substrates could be used.

It was indicated above that the coating 16 is a freshly painted paint coating. In the context of the present invention the term "freshly painted" means that the paint is tack-free (dry to the touch) though not fully cured. The term "tack-free time" is defined in the Paint and Coating Testing Manual (14$^{th}$ Ed. of the Gardner-Sward Handbook, which is identified as ASTM Manual Series: MNL 17 ASTM PCN 28-017095-14). On pg. 440, col. 1, §3, under the heading "Tack-Free Time", we find the following definition:

"The test film is considered to be tack-free when no stickiness is observed under moderate pressure. This can be measured by either of two methods:

"The first test method is described as follows:

a. Paper Test Method

A special paper (K-4 Power Cable Paper) [3] is placed on the test film under a weight of 2 psi (13.8 kPa). After 5 s, the weight is removed and the test film inverted. If the paper drops off within 10 s, the film is considered tack free.

A variation of the above method is used to test the tack-free time of insulating varnishes. The varnish is considered tack free when the paper is placed on the test film under the weight of 1 lb (450 g) for 1 min and tested as above."

In that same text on pg. 40 immediately below the test methods described above, there is described a mechanical tack tester where there is a strip of metal that is bent to form a base 1" square. A 300 gram weight is placed on the center of the base and allowed to set for 5 seconds. The test film is tack free when the tester tips over immediately after the weight is removed.

In the method of the present invention, the paint may initially be dried at room temperature to become tack-free, but in a commercial operation the paint would normally be oven dried or otherwise be dried at a higher temperature. The term "paint" is meant to include various paint types, including paints that are water based (latex paints) and solvent based. Curable alkyd paints are included within the broader scope of the present invention, but these have been found in some instances more difficult to effectively apply as the protective coat.

To explain further the timing of the application of the plastic film, reference is made to FIG. 7, which is a graph where the paint curing time is plotted against the degree of paint cure. It can be seen that shortly after the paint is applied, the curing proceeds rather rapidly until it reaches the "tack-free time". At this time, the surface of the paint would feel dry to the touch, and the curing process of the paint is still going on, but more slowly. It has been found that the film will adhere more effectively to the painted surface if it is applied in a moderate time after the coat of paint has become "tack-free" in accordance with the strict definition thereof.

With the application of the plastic extrusion coating being accomplished, the paint continues to cure. This effect is facilitated by providing for a proper degree of permeability relative to gases so that the gaseous components of the paint (i.e., volatiles such as water vapors or organic solvents) are able to escape as the curing continues. Also, for some paint compositions, this permeability is required to permit oxygen or water vapor to come into contact with the paint as it is curing. It is to be understood, however, that there are some paints or paint-like compositions which have no volatilizes that need to escape from the paint layer during curing. Therefore, within the broader scope of the invention, it should be understood that the present invention could be beneficially utilized to provide protective coatings for those types of paint or paint-like surfaces.

The permeability that is necessary for gaseous substances to pass from (in some instances into) the paint can be provided in either or both of two ways. First, the substrate itself could be permeable, and if the substrate is wood or cementious wood, then the substrate itself will provide a certain degree of permeability. Second, as will be described further later in this text, the composition of the thermoplastic film can be selected and/or formulated so that it provides a desired degree of permeability. In the preferred embodiment, it is generally advantageous that both the substrate and the protective thermoplastic film provide an element of permeability.

If the substrate is made of aluminum or steel, then the degree of permeability would be (for purposes of accomplishing the ends of present invention) substantially zero. Accordingly, if the present invention is to be used with such metal substrates, then it would be necessary to have the proper degree of permeability provided by the thermoplastic protective coating.

Also, the permeability of the material for the thermoplastic protective coating may vary depending upon the type of paint which is being used. The volatiles of some paints will permeate more readily through some resins than others. Further, some thermoplastic coatings may have desirable permeability characteristics with regard of the volatiles leaving the paint, but would be more resistance to permitting the flow of oxygen or water vapor through the protective layer to the paint if the paint is of a type that would require oxygen for a proper curing.

Also, the permeability will depend on the thickness of the thermoplastic protective layer. In general, the dried thermoplastic layer would be between about two to ten mils, and more desirably move toward the thinner portion of this range, so as to enhance permeability.

Also, the selection and/or formulation of the film material should be such that after it is applied to the paint surface, the film coating will adhere to the paint surface with sufficient strength so that it would remain in place during normally expected handling. However, this adherence to the paint surface should not be so great so that the film cannot be readily peeled off the painted surface of the board.

In some instances, the surface of the substrate is somewhat uneven, embossed, or "rough" so that there are indentations and raised portions. It has been found that in the present invention that the film is sufficiently compliant so that when compressed by the compressable roller, the film will conform to the rough surface and extend into these valleys so that proper adhesion of the film to the substrate is accomplished.

After the film is applied to the panel, the film is then cooled. This cooling could be accomplished simply by exposing the film to ambient air temperature. Alternatively, the cooling of the film could be enhanced by applying a cooling medium to the film and/or the substrate (e.g. by blowing air).

Immediately after (or nearly immediately after) the above process is completed (i.e., the plastic film 22 is applied and cooled), these boards 10 with the protective plastic coating can be stacked one on top of the other (without inserting any intermediate slip sheets as in the prior art). In this stacked configuration, the paint coating 16 remains protected and there is no sticking of one board to another. Then the boards 10 in the stack can be secured (by ribbons or cords extending around the stack) and be safely shipped to the building site or other location. Even if there is some lateral sliding between the boards, this will normally not damage the paint layer.

As indicated previously, the protective coating provided by the present invention does not damage or degrade the painted surface. The painted surface often has a very complex micro-texture, responsible for some optical effects, associated with appearance. It has been found that after the removal of the protective plastic coating, the gloss, texture, and the color of the painted surface remain substantially unaffected. The extruded thermoplastic film will conform to the surface texture of the paint, creating a protective film across the entire surface, and not moving relative to the painted surface.

Also, in the present invention, with the protective film adhering to the painted surface, this would normally prevent surface contact of the paint with water during transportation and/or storage before installation. Contact with water for some painted materials, such as cedar or fiber/cement boards, may cause damage in the form of discoloration due to efflorescence or tannin bleeding, which may be reduced or eliminated by the thermoplastic coating of the present invention.

As indicated above, by way of example, the present invention is being described in a situation where the substrate is a wooden board, such as a siding board. Prepainted siding boards are notorious for handling and installation problems on construction sites where damage to painted surfaces may easily occur.

When the coated panels or boards of the present invention are delivered to the construction site, they can be moved about with the protective coating still in place, thus protecting the painted surface. When the boards are actually to be made part of the house or building, (such as siding boards which are to be placed on the side of a house) these boards can be carried to the location where they are to be nailed in place, and the protective film can then be peeled away from each board as it is being installed. Alternatively, with the protective coating still on the board, the board can be nailed only partially in place (e.g., by using two nails in spaced locations and pounding them just part way in, i.e., so that the head of the nail is not flush against the board surface) and then the protective strip can be peeled away. There will generally be no fragments of the film still clinging to the board at the location of the nail(s). Then the nails can be pounded flush against the panel surface and other nails pounded into place.

The ability to apply hot, melted thermoplastic material onto non-fully cured paint without damaging the paint, and being able to remove the thermoplastic film later without change in painted surface characteristics such as gloss, texture, or color, was unexpected and not known in prior art to the best knowledge of the applicants. Also, the curing of paint while covered by the protective film was unexpected as well.

As indicated above, in the process of the present invention, paint is applied to a smooth, rough, or embossed substrate using conventional means and the paint dried to the point of being tack-free (dry to the touch), though not necessarily fully cured (see FIG. 1). The paint may be air-dried or force-dried. Also, preheating the paint surface prior to extruded film application may be beneficial. This process has been found to work well for a variety of paint types including latex paints and oil-based, and under certain conditions, air curable alkyd paints.

The thermoplastic resin can be applied as a film to the painted substrate using conventional thermoplastic extrusion equipment. A plastics extruder equipped with a casting film die is preferred for applying the hot, thin film to the painted substrate. Also, as indicated above, the paint can continue to cure after film application. Within the broader scope, the present invention could be utilized in a wide variety of situations where a protective, removable film is required over a freshly painted flat substrate. Examples of such applications include wood or wood composite paneling or siding, wood-cementitious boards, aluminum, etc. As indicated above, gas or vapor permeable substrates are preferred for improved removal of volatiles materials remaining in non-fully cured paint or other coatings. However, the plastic film itself may be sufficiently permeable to allow effective migration of volatiles such as water vapors, organic solvents, or air components such as oxygen to migrate and cure protected paint film, allowing for volatiles migration and paint curing even on non-porous substrates.

b) The Film Material and the Examples

The film material which is used in the present invention is a thermoplastic polymer, or a combination of polymers, and also with the possible addition of additives, depending upon the physical properties of the polymer.

In general, the desired physical characteristics of the polymer include the following:

i) sufficiently high permeability;
ii a processing temperature within a desired range;
iii) proper adhesion characteristics;
iv) sufficient tensile strength and other mechanical properties; and
v) impermeability to liquids.

These will be discussed under the appropriate headings.

i) Permeability

With regard to permeability of the protective film, as indicated earlier in this text, since the protective film is applied to the paint coating that is still in the stage of being fresh paint, it is advantageous for the paint to cure during the period when the protective film remains on the paint surface. Thus, as the paint continues to cure, it would often be necessary that the volatiles that need to escape from the paint layer during the curing process can pass through either the protective film, the substrate to which the paint is applied, and desirably through both the protective film and the substrate. In the case of 100% solids coatings, permeability of the protective film is not required as there are no volatiles.

In general, the rule is that the higher the permeability to gaseous substances, the better. However, the protective film coating should not be so highly permeable that it permits liquid (i.e. water) to pass through the protective film. If the substrate is for all practical purposes totally impermeable (e.g. either an aluminum or steel substrate), then a sufficiently high degree of permeability for the protective film is critical. However, if the substrate is wood that has a higher degree of permeability (e.g. pine), then there is more flexibility in having a lower permeability, or conceivably no permeability at all for the protective film. However, it would still be desirable to have a reasonable degree of permeability for the film to permit the curing of the paint to occur more rapidly.

However, as indicated earlier in this text, if the present invention is used in connection with a paint material or a paint-like composition which does not have volatiles that need to escape during curing, then permeability may not be a critical factor and the film could have much lower permeability or possibly highly impermeable.

Another factor affecting permeability is the thickness of the film (obviously a thinner film would have greater permeability than a thicker film). Another factor is that various polymers may have different permeability characteristics depending upon the type of paint used. The protective film may have a greater degree of permeability relative to some volatiles, and not to others. Also, as indicated earlier in this text, for some paints it is necessary (or at least desirable) that oxygen from the surrounding atmosphere would be able to interact with the paint surface, and thus the protective film should have permeability relative to the oxygen.

There are various sources in the technical literature which present various characteristics of a wide variety of polymers, and among these characteristics there is usually a listing of the permeability of that polymer. Accordingly, is well within the person of ordinary skill in this art to be able to make a selection of the proper polymer (or a combination of polymers) which would be suitable candidates for the material of the protective film.

The permeability of low-density polyethylene was ascertained as follows:

Water vapor transmission: 1.0–1.5 g-mil/100 sq.in./24 hrs;
$CO_2$ transmission: 2700 cc-mil/100 sq.in.-24 hr-atm;
$O_2$ transmission: 500 cc-mil/100 sq.in.-24 hr-atm;
$N_2$ transmission: 180 cc-mil/100 sq.in.-24 hr-atm.

ii) Processing Temperature of the Polymer

The material for the film that is in the extrusion die must be at a sufficiently high temperature so that it will flow and can be extruded as a thin film, and also so that it will have sufficient flow so as to properly conform to the paint surface and also adhere thereto. However, if this processing temperature is too high, and if the temperature of the film is at a sufficiently high level when it is deposited upon the paint surface, the paint may be caused to blister or otherwise be damaged. For example, in some of the testing done in connection with the present invention, a polymer which was processed at a temperature of 300° C. in some instances did cause blistering. However, it should be understood that there are various factors which affect this. One of these is to what degree the paint has dried before depositing the film. Also, it may be that the method of deposition is such that if the film extruded from the die is able to cool somewhat in ambient atmosphere before engaging the painted surface, that would have an effect. Also, the character of the paint would be a factor.

On the other hand, if the protective film has a softening point that is too low, then at a later time when the planks or boards are stacked one on top of the other and there is a rather high ambient temperature and sunlight, then the protective film may soften so as to adhere to the upper panel or loose some of its function as a protective coating.

In the experimental work which has been conducted thus far, it has been found that a satisfactory processing temperature for the protective film being applied is about 240° C., and also a processing temperature of 204° C. has been found to be satisfactory, and temperatures between 240° C. and 204° C. would also be satisfactory. This temperature of 240° C. or 204° C. refers to the temperature of the film in the extrusion die, with the assumption that the temperature of the film material does not drop substantially prior to being deposited upon the paint surface. However, this temperature would vary at or between various numerical value limits, and this could be, for example, 230° C., 220° C., 210° C. or 200° C. Also, this could be down to 190° C., 180° C., 170° C., or possibly as low as 140° C. or 100° C. Depending on various factors including polymer type and formulation, in some applications in which the present invention could be used, it may be conceivable this melting temperature could be even lower such as 180° C., 170° C., or even 160° C. or conceivably lower.

With regard to the upper temperature limits, present analysis indicates that this could be at 245° C., 250° C., 255° C., 260° C., 265° C., 270° C., 275° C. and 280° C. However, depending upon various factors, this could conceivably be as high as 290° C., 300° C., 310° C., 320° C., or possibly higher.

Another consideration, of course, is that the temperature be at a level where it would not undesirably modify the character of the paint surface relative to its surface characteristics such as gloss and color. The necessary analysis and experimentation which would be needed to determine the limitations would be well within the capabilities of one of ordinary skill in this art.

iii) Adhesion Characteristics

The adhesion of the film to the paint surface should be of a sufficiently high strength so that the film would adhere to the painted surface during handling, storage, etc. However, the adhesion should not be so great so that the film cannot be readily removed (i.e. peeled off) when it is at its end use location and the protective film is to be taken off. In general, the range of the level of adhesion would be on the low side at about 10 N/m (Newtons per meter). On the high side, the adhesion strength would be about 30 Newtons per meter. Depending upon the particular application of the present invention, the desired level may be at or between intermediate values, such as about 15, 20 or 25 Newtons per meter. Further, in some situations (e.g. where the substrate is exposed to rather rugged conditions), the adhesion force would possibly be higher such as 35, 40, 45 or 50 Newtons per meter or possibly even higher. On the other hand, for some applications where the adhesion force could be lower such as 9, 8, 7, 6, or 5 Newtons per meter or conceivably even lower.

iv) Tensile Strength, Tear Strength, and Wear

In general, sufficient tensile and tear strength are required with the protective film such that the film does not break or tear during removal. However, tensile and tear properties are usually related to wear properties of the protective film and sufficient wear resistance is required such that the protective film and hence the paint is not damaged during the handling or transportation process.

v) Impermeability to Liquids.

The protective film should be sufficiently impermeable to liquid (normally meaning water) to protect the painted surface. It is well known within the skill of the art how this could be accomplished in the selection and method of application of the protective film.

In the text which follows, there will be a further discussion of the polymers which have been found suitable (or not suitable) in the present invention, and there will also be presented various examples relating to the present invention.

On the basis of testing and/or analysis which has been done thus far in connection with the development of the present invention, polyolefin resins have been found to be able to advantageously be used in the present invention, because of their desirable qualities of low temperature, processability and cost, high gas permeability, and relatively good durability. Also, quite possibly, additives which increase gas permeability in the resin could be beneficial. The following types of polyolefin resins were evaluated, these being the following:

i) Low density polyethylene (LDPE)—Novapol LC-0517A (Nova Chemicals);

ii) Linear low density polyethylene (LLDPE)—Dowlex 3010 (Dow Plastics);

iii) High density polyethylene (HDPE)—Alathon M6030 (Equistar Chemicals);

iv) Metallocene polyethylene (MPE)—Affinity PL1850 (Dow Plastics);

v) Polypropylene (PP)—DS4 (Union Carbide)

Three of the above-noted materials were demonstrated to be satisfactory, namely, the low density polyethylene (LDPE), the linear low density polyethylene (LLDPE), and the metallocene polyethylene (MPE). However, the remaining two (i.e. the high density polyethylene (HDPE) and the polypropylene (PP)) were not found to be satisfactory since they separated from the substrate too easily.

In addition, non-polyolefin resin types were also evaluated for ability to be extrusion coated onto freshly painted surfaces. These resins included the following:

i) Vinylidene Chloride/Vinyl Chloride Copolymer—Saran XUS 32019, 10L;

ii) Recycled Polystyrene—Melt flowrate 2.

Both of these materials were found to be satisfactory.

Also, polystyrene resin was found to be able to be used in the present invention when modified with styrene/Butadiene Block Copolymer (e.g. KratonB 1102-Shell) and Polymethylstyrene (e.g. Resin 18-Amoco).

In order to improve adhesion of the film to the painted surface while processing at lower temperatures, adhesion promoters are preferred to be added to the resin prior to extrusion as film. Many compatible adhesion promoters can be utilized. Preferred adhesion promoters for polyolefin materials include tackifying resins such as hydrocarbon resins, rosin, modified rosins and mixture thereof. Other modifiers are preferred, and ethylene/acrylic copolymer resins known in resin compounding to increase adhesion to substrate during extrusion. The following commercially available adhesion promoters were evaluated, and these are identified by their brand names as follows:

i) Piccopale 100 (Hercules) aliphatic hydrocarbon resin
ii) Wingtack 95 (Goodyear) aliphatic hydrocarbon resin
iii) Sylvares TR1135 (Arizona Chemical) terpene resin
iv) Eastotac H130U (Eastman) aliphatic hydrocarbon resin
v) Bynel 2002 (Dupont) acid-modified ethylene acrylate
vi) Bynel 2174 (Dupont) anhydride-modified ethylene acrylate
vii) Amoco Resin 18 polyalphamethylstyrene The adhesion promoters can be added to the thermoplastic resin in amounts typically ranging from 0.25 to 30% by weight but preferably from 0.25 to 15% by weight of the total resin/promoter mixture.

The following examples illustrate various features of the present invention in more detail.

EXAMPLE 1

Example 1 illustrates the results of using the first six of the seven adhesion promoters listed in the preceding paragraph. Each of the six adhesion promoters was added to polyolefin resins at 10% of the total weight of resin and tackifier, and extrusion coated onto latex-coated wood/cementitious boards. The extrusion coating was applied using a Brabender Plasticorder extruder with ¾" screw and 4" wide cast film die. The processing temperature for application was 240° C. and the extrusion coating was applied at approximately 3 mil thickness to Hardie fibre/cement boards coated with Valpro acrylic latex paint (Product No.-LWW0028). The adhesion of the extrusion coating to the painted substrate was evaluated according to ASTM D3330 (180° Peel Adhesion).

The combined adhesion data for all experiments is shown in Table 1 in the drawings. The results indicate that peel strength performance is best for metallocene resin although LDPE also showed good results when different resins were compared for adhesion with the Piccopale 100 tackifier added. In the evaluation of different tackifiers with LDPE resin, Sylvares TR1135 had the best peel strength, followed by Eastotac H130U.

It has to be stressed that resins with no adhesion promoter added showed a lack of adhesion to the painted substrate when extruded under described conditions. Also Bynel resins did not improve adhesion performance.

It also has to be mentioned that adhesion of above 10.4 N/m was required under experiment conditions to avoid self delamination of film from the substrate due to stress development. Adhesion in the order of 30 N/m was assessed as being on the higher side of requirements for easy peeling of film from the substrate.

It has to be taken under consideration in the selection of tackifier level that excessive addition of tackifiers reduces mechanical properties and wear of protective films (see Table 2). On the other hand, an increase in tackifier concentration allows the reduction of extruded resin temperature to obtain sufficient adhesion between the paint surface and the protective plastic film. Highest retention of properties was achieved with Wingtack 95 tackifier, although all tackifiers showed good tensile property retention (greater than 74%).

EXAMPLE 2

Valpro latex paint was applied to Hardie fibre/cement boards to obtain a dry thickness of 2 mil. The paint was tack free after 15 minutes of drying in room conditions but blocking was observed after two hours under a load of 82 lbs over a four square inch area. Extrusion coating of LDPE containing 10% of Eastotac H130U tackifier was applied at 240° C. processing temperature after the paint had dried at room temperature and relative humidity 35–55% for 15 minutes.

The capability of extrusion coating onto freshly-painted substrates was evaluated by measuring degree of paint cure through the paint abrasion properties of extrusion coated versus non-extrusion coated specimens. Wear was evaluated over 100 cycles using a Taber Abrader equipped with a CS 10 wheel under 500 gram load according to ASTM D4060. Painted substrates were extrusion coated shortly after the paint was tack free. Non-extrusion coated specimens were tested for blocking.

The results of abrasion testing are shown in Table 3 for extrusion film coated and unprotected specimens. The results show that the extrusion coating allows the paint to continue curing on the porous wood/cementitious substrate, only at a lower rate than the unprotected board.

EXAMPLE 3

The procedure in Example 2 was repeated except fibre/cement board was replaced by pine board and Acrylic Latex paint (Valpro) was replaced with Mills Rustic Wood Stain Latex (Mills Paint Sales Ltd.) Paint was tack-free after 1 hour but blocking was observed after 2 hours drying. Extrusion coating was applied after 1 hour drying. The results of abrasion testing are shown in Table 3.

EXAMPLE 4

The procedure in Example 2 was repeated except that Valpro latex was replaced with Alkyd primer (Cabot, product no. 1572). The paint was tack-free after 1 hour drying and blocked following 4 hours drying. The results of abrasion testing are shown in Table 3.

EXAMPLE 5

The procedure in Example 3 was repeated except that pine board was replaced with aluminum sheet. The paint was tack free after 1 hour drying and extrusion coating was applied at that point. Results of wear testing are shown in Table 3. The results show that paint cure proceeds even on non-porous surfaces (i.e., substrates).

EXAMPLE 6

The procedure in Example 3 was repeated except that polyolefin resin was replaced by Saran resin (XUS 320 19.10L (Dow Chemical) vinylidene chloride/vinyl chloride copolymer). The abrasion results are shown in Table 3. The resin contained no adhesion promoter but was able to stick well to the painted surface.

EXAMPLE 7

The procedure in Example 6 was repeated except that Saran resin was replaced by recycled polystyrene resin (melt flow rate 2) modified with Kraton D1102 SBS (Shell) resin and Resin 18 (polyamethyl styrene modifier-Amoco). The abrasion results are shown in Table 3.

EXAMPLE 8

Evaluation of blocking characteristics of painted surfaces was conducted and compared to blocking for extrusion-coated specimens. Valpro latex was applied to Pine and Hardie fibre/cement boards at 2 mil dry thickness. Cabot Alkyd was also evaluated at 2 mil dry thickness on Pine and Hardie fibre/cement boards. On extrusion coated samples, LDPE containing 10% Eastotac H130U tackifier was applied at 240° C. at a thickness of 3 mils. Test samples were pressed together at a pressure of approximately 5 psi starting at various time intervals after paint application. Plastic protective film was applied at the time the paint became tack free. The results are shown in Table 4. All samples continued to block for extended periods after the tack free time for each paint type. The extrusion coating was applied when the paint was tack free and no blocking was observed for samples which had the extrusion coating on them.

EXAMPLE 9

Samples were prepared according to Example 3 except that Mills Latex paint was replaced with Valpro Latex paint and the gloss and color changes were evaluated for extrusion coating and slip sheet approaches. Samples were evaluated for one day appearance and under 5 psi stacking pressure for one week.

The task for determining gloss is that which is described in ASTM D523. The test for ascertaining the color or color shift of the paint coat was done in accordance with ASTM E1331, It can be seen by examining Table 5 that the gloss of the paint with the protective film of low density polyethylene (LDPE) being applied was substantially the same one day after the test began and seven days after the test began.

Also, as indicated in Table 5 the change in color was examined and it should be noted that the value which is shown in Table 5 for the color shift is not the value representing the color itself, but rather the degree of change. A change that is any smaller than 1.0 is considered to be a change that is so small that it would hardly be noticeable. It can be seen that the painted surface of the pine substrate with the protective film placed thereon had negligible color shift.

EXAMPLE 10

Samples were prepared according to example 2 and gloss and color changes were evaluated for extrusion coating on fresh alkyd paint after 4 days as shown in Table 6.

As with latex paint, no significant effect on gloss or color of the Alkyd paint surface was observed following extrusion coating.

EXAMPLE 11

Fibre/cement Hardie siding boards were finished with Valpro acrylic latex paint and protected with extruded at 240° C., 6 mils 10% Piccopale 100 modified LDPE film (Novapol LC 0517A). Boards were then nailed, put on the wall according to siding installation practice and protective film was removed.

Protective film could be torn along the side overlap line, and nails did not create an obstacle in protective film removal.

c) The Apparatus of the Present Invention and the Method

As discussed earlier in this text, the protective plastic film can be applied continuously to a substrate which is moving continuously through an operating location, or could be applied continuously to individual panels placed end to end and immediately adjacent to one another. It is also possible that the items to be coated could be processed individually.

One preferred method and apparatus for practicing the present invention in an automated manner has been developed for applying the protective coating to separate boards or panels which are directed sequentially through an operating location with these being spaced from one another. This apparatus 30 and the method will now be described with reference to FIGS. 2–6.

As a preliminary comment, earlier in this text, there was a description of the general overall operating of applying the film 22 to the paint layer 16, and that discussion discloses an extrusion die 19 and a compression roller 28. The arrangement shown in FIG. 1 could apply to either a continuous coating process, or an intermittent process where separate panels (or boards) would be coated sequentially. To avoid confusion, different numerical designation will be given in describing the apparatus 30, since these have particular functions that relate specifically to this apparatus 30.

The apparatus 30 comprises a first conveying section 31 which carries a plurality of boards (one of which is shown at 32 and having an exposed upper surface area 34) toward an operating location 36. In this embodiment, a plurality of rollers are used. Alternatively, other conveying devices (e.g., a conveyor belt, etc.) could also be used in other embodiments. An extrusion die apparatus 38 is positioned at an upper part of the operating location 36, and this die apparatus 38 extrudes a continuous thin plastic film sheet at a high temperature downwardly in the operating location 36.

It is believed that a better appreciation of various aspects of the functions of the apparatus of the present invention will be obtained by first discussing briefly the thin, hot plastic film that is being extruded from the die apparatus 38. A characteristic of this viscous/liquid plastic in a very thin form is that it will tend to shrink or contract in directions parallel to the plane of the plastic film. Thus, as the film is extruded from the slot-like nozzle 39 of the extrusion die apparatus 38, the side edges of the film will be contracted inwardly toward a longitudinal center line, and the front edge of the film (unless otherwise restrained) will tend to shrink linearly in a direction parallel to the lengthwise axis of the film. Thus, if the film is being extruded from the slot-like nozzle of the die apparatus 38, and if there is a front edge of the film travelling downwardly from the die apparatus 38, there would be an upward contraction in a direction opposite to the direction in which the film is being discharged. Thus the front edge of the film would be slowing down significantly since that front edge is being contracted in a direction opposite to the direction of travel of the film from the slot-like nozzle.

Because of this and for other reasons, between the time that is highly desirable that the time period a portion of the film is being extruded from the slot-like nozzle of the die apparatus 38 and the time when that portion engages the paint surface of the board should be very short. With that being given as introductory information, let us now return to the more detailed description of the apparatus 30.

The center line of the compression roller 48 is about 4½" forward of the nozzle 39, and the nozzle 39 is about ¼" to ½" above the surface of the board 32 (or more precisely, ⁵⁄₁₆")

Positioned at the lower part of the operating location 36, is a catch section 40 which comprises continuous belt 42 that is carried by upper and lower rollers 44 and 45. Also located at the operating section 36 is a compression section 46 comprising a compression roller 48. Located below the compression roller 48, is a separating section 50 which comprises a chill roller 52. The chill roller 52 can be cooled (e.g. internally cooled) to maintain its surface temperature at a sufficiently low level.

There is a second conveyor section 54 (not shown in FIG. 2) which carries each of the boards 32 away from the operating location 36. Further, there is a cooling spray device 56 which is at a position below the level of the board 32 travelling into the operating location 36, and the function of this cooling spray device 56 will be described below.

With this general description of the main components of the apparatus 30 having been presented, there will now be a description of the overall operation of this apparatus 30, with reference to the schematic drawings of FIG'S. 3–6.

To facilitate the following description, in the following text the term "forward" shall be considered to be the direction of the path of travel of the board 38 as it moves from the left-hand side of FIG. 3 into the operating area. Also, the term "upper" shall be considered a direction leading toward the upper part of the sheet on which FIG. 3 is located, and the term "downwardly" will refer to the opposite direction.

Figure 3:
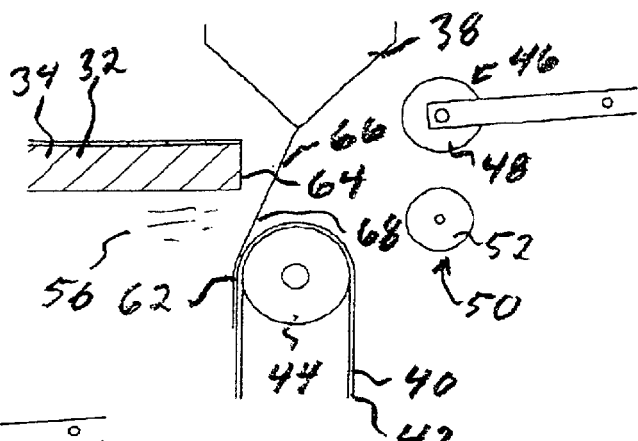
FIGS. 3–6: are side elevational views, similar to FIG. 2A, showing a sequence of steps of the application of the film in the process of the present invention.

With reference to FIG. 3, it can be seen that the front-end 58 of the board 32 is moving into the operating location 36. At the same time, a thin hot plastic film or sheet 60 is being extruded from the die apparatus 38 and is moving downwardly where a lower portion of the film 60 is captured at 62 by the belt 42 to be carried to a location further downwardly.

Figure 4:
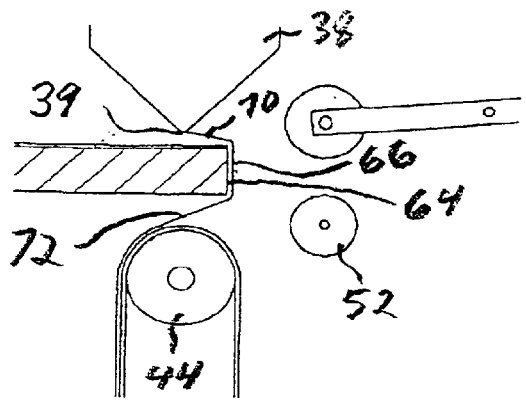

It can be seen with reference to FIG. 3 and FIG. 4 that as the board 32 continues to move forwardly from the position of FIG. 3, the forward flat vertical aligned butt end surface portion 64 of the board 32 comes into engagement with a portion 66 of the film 60. At the instant that the forward surface portion 64 of the board 32 is engaging the film portion 66, the cooling spray of device 56 discharges a short burst of a water spray or mist (in the order of microseconds), as indicated at 67 in FIG. 3 against a film portion 68, that is just below the film portion 66 that is engaged by the forward surface 64 of the board 32. This short burst of the water spray immediately toughens the film portion 68.

As can be seen in FIG. 4, as the board 32 continues to move in a forward direction, the adjacent portions of the film 60 above and below the board 32, respectively, are being carried in a forward direction and stretched, with these film portions being indicated at 70 and 72, respectively. In one preferred embodiment, the boards 32 are being moved forwardly at about 200 feet per minute, and the film 60 is being discharged from the die apparatus 38 at about 30% of that speed. Desirably, the film discharge rate should be no more than about ¾, ½, ⅓, or ¼ of the velocity of the boards or possibly slower than ¼.

As the forward motion of the board 32 continues to the position shown in FIG. 5, it can be seen that the forward end 58 of the board 32 has moved to a location below the compression roller 48. The compression roller 48 is positioned so that the film comes into contact with the lower surface of the roller 48 when the film portion indicated at 74 arrives at the roller 48. The compression roller 48 remains in contact with the film 60, pressing the film 60 against the upper surface 34 of the board 32, throughout the forward travel of the board 32 in the operating location 38.

The chill roller 52 of the separating section 50 is positioned at a stationary location below the compression roller 48 at a level such that the upper surface of the chill roller is located at the lower surface of the board to come into contact with that portion 68 of the film 60, which had just previously been cooled by the water spray or mist from the device 56. The water spray device 56 has advantages, but the apparatus has been operated without need of the water spray device 56 operating. This chill roller 52 is being rotated in a counter-clockwise direction as indicated by the arrow 76, so that the upperwardly located surface portion of the chill roller 52 that is engaging the film portion 68 which is travelling rearwardly. This causes the film portion 68 to move in a rearward direction, thus separating the film portion 68 from the film portion 66 that is located against the front surface portion 62 of the board 32, with the break occurring at the lower edge of the forward surface butt end portion 64 of the board 32. The effect of this is that the film portion 66 remains adhering to the forward surface 64, while the film portion 68 is separated from the film portion 66 and travels downwardly with the rest of the film that has been captured, and is being carried downwardly, by the carrier belt 42 of the catch section 40.

Figure 5:
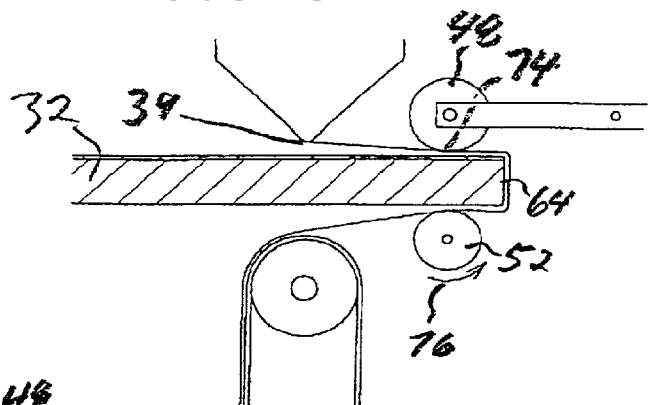
Figure 6:
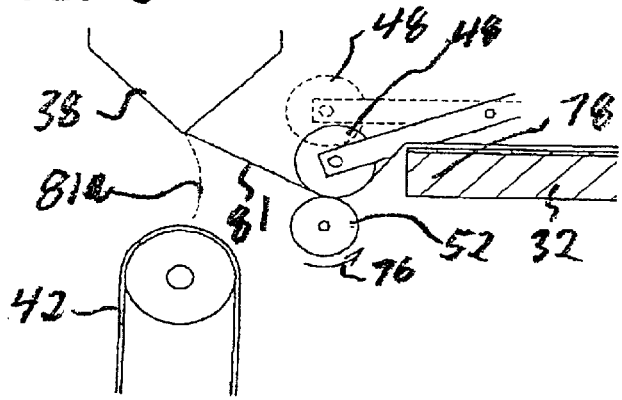

From the position of FIG. 5, the board 32 continues its forward path of travel, as the film 60 is being applied to the upper exposed surface area 34 of the board 32, until the rear end 78 of the board 32 continues its forward movement to pass out from under the compression roller 48, as shown in FIG. 6. At that time, the compression roller 48 immediately moves from its upper position (shown in dotted broken lines in FIG. 6) downwardly to a lower position shown in solid lines, so that the compression roller 48 presses the portion 80 of the film against the chill roller 52. The chill roller 52, continuing its counter-clockwise rotation, causes a separation of the film at location 80 at the top rear edge of the board 32. After that separation, there is a the film portion 81 that continues to be extruded from the die apparatus 38 and as this film portion 81 drops downwardly by gravity, an air blast 82 is employed to help disengage the film from the chill roller 52 and to blow the film portions 81 downwardly away from the chill roller 52, (as indicated in a broken line at 81a) and to cause the film portion 81/81a to engage the belt 42 of the catch section 40 to be carried downwardly in contact with the carrier belt 42.

With the application of the film 60 to the board 32 having been completed, and with the board 32 being carried away from the operating location, the next board 32 is being carried by the conveyor 31 into the operating area. At the same time, the film 60 is being continuously extruded from the extrusion die apparatus 38 and this film 60 is being captured by the catch section 40 as described above. The film 60 travels from the nozzle of the extrusion die apparatus 38 at a downward and rearward slant to a location that is horizontally rearward of the extrusion die nozzle, and the travel of the belt 42 of the catch section 40 is faster that the discharge velocity of the film 60 so that the film is stretched to some extent. This prepares the film for engagement with the next board 32. Thus, when the next board 32 arrives at the operating location 36, the same process is repeated as described with reference to FIGS. 3-6.

In the particular operation described above, the spacing between the boards 32 on the conveyor could be, for example, four feet apart and thus there is a section of film 60 which is travelling downwardly toward a collection location for the waste plastic film material located below the catch section 40. Then, when the film portion 68 is severed from the film portion 66 (see FIG. 5), the severed belt section drops into a collection container.

It may be that during certain time periods, the production line is stopped. On the assumption that the production line is going to be started up again (e.g., in an hour or two), the extrusion die apparatus 38 will continue to operate and discharge the film 60. In that case, the film 60 will be collected as a roll, and the manner in which this is done will be described later in this text.

With the overall operation of the system being described above, there will now be a more detailed description of various components of the overall apparatus 30.

As described earlier in this text, the compression section 46 comprises the compression roller 48. This compression roller has a compressible surface layer, and in this embodiment this layer is made of soft silicone closed cell foam. It has been found that if the layer has a durometer reading of about 20 durometers, roller 48 accomplishes its functions satisfactorily. Also, during the application of the foam layer, the roller 48 is continuously sprayed with a mist to keep the surface of the compression roller 48 cool so that it does not stick to the plastic film and also to assist in cooling (hardening) the plastic film.

The compression roller 48 is mounted at opposite ends by a pair of horizontally aligned mounting arms 82, each of which is in turn mounted to a pivot location 84 to a related post 86. The pivot location 84 for each mounting arm 82 is at a location approximately mid-way between the opposite ends of the arm 82.

A tension spring 88 is connected between the forward end of at least one of the arms 82 and the upper end of its related post 86, to urge the compression roller 48 downwardly. To move the compression roller 48 upwardly or downwardly, there are provided two positioning mechanisms 90, each connected to a related arm 82 rearwardly of the pivot location 84. In this particular embodiment, these positioning mechanisms are shown as solenoid actuators but obviously other positioning devices could be used.

To rotate the compression roller 48, there is provided a drive mechanism 91 comprising a drive belt 92 and forward and rear sheaves 93, with the forward sheave 93 being connected to the compression roller 48. An adjustable stop 95 (see FIG. 2A) is provided to limit the upward movement of the compression roller 48, this stop 95 being shown as engaging a lower part of the forward end of one of the mounting arms 82.

There is an air blast device 96 which is positioned so that its elongate nozzle 97 is positioned to direct a blast of air downwardly and rearwardly between the compression roller 48 and an adjacent surface portion of the extrusion die apparatus 38. As indicated previously in this text, the function of this is to eject a blast of air against the portion 81/81a of the film (see FIG. 6) after the trailing edge of the film is separated by the combined action of the compression roller 48 and the chill roller 52.

To keep the outside surface of the compression roller 48 sufficiently cool, there is provided a compression roll misting device 98 (not shown in FIG. 3, but shown in FIG. 2A) which continuously discharges at a controlled rate a spray of water a nozzle in the form of a uniformly applied mist or fog, this being a nozzle sold under the name of "Fog Nozzle", to keep the surface of the compression roller 48 sufficiently wet and cool. Thus, the compression roller 48 in contacting the film 60 and pressing it against the board upper surface 34, cools and compresses the film 60 to cause it to adhere to the upper painted surface 34. Also, the air blast device 96 extends along the length of the compression roller 48 and is positioned to shield the roller 48 from the heat of the extrusion die apparatus 38.

Also, there is provided at a lower part of the operating location 36 a spray device 100 which is located forwardly of the forward portion of the carrier belt 42. The water, in the form of a spray or mist, which is discharged from the device 100 is directed against the outer surface of the belt 42 to maintain the belt's surface at a sufficiently low temperature. This avoids the potential problem of the adjacent portion of the film 60 from adhering too tightly to the surface of the belt 42.

The system described above is desirably fully automated, and photocells are used to detect the presence of the board passing by. Also, there is a control apparatus, indicated schematically at 101 (see FIG. 2A), which controls the timing of the various operations described above.

Figure 2:
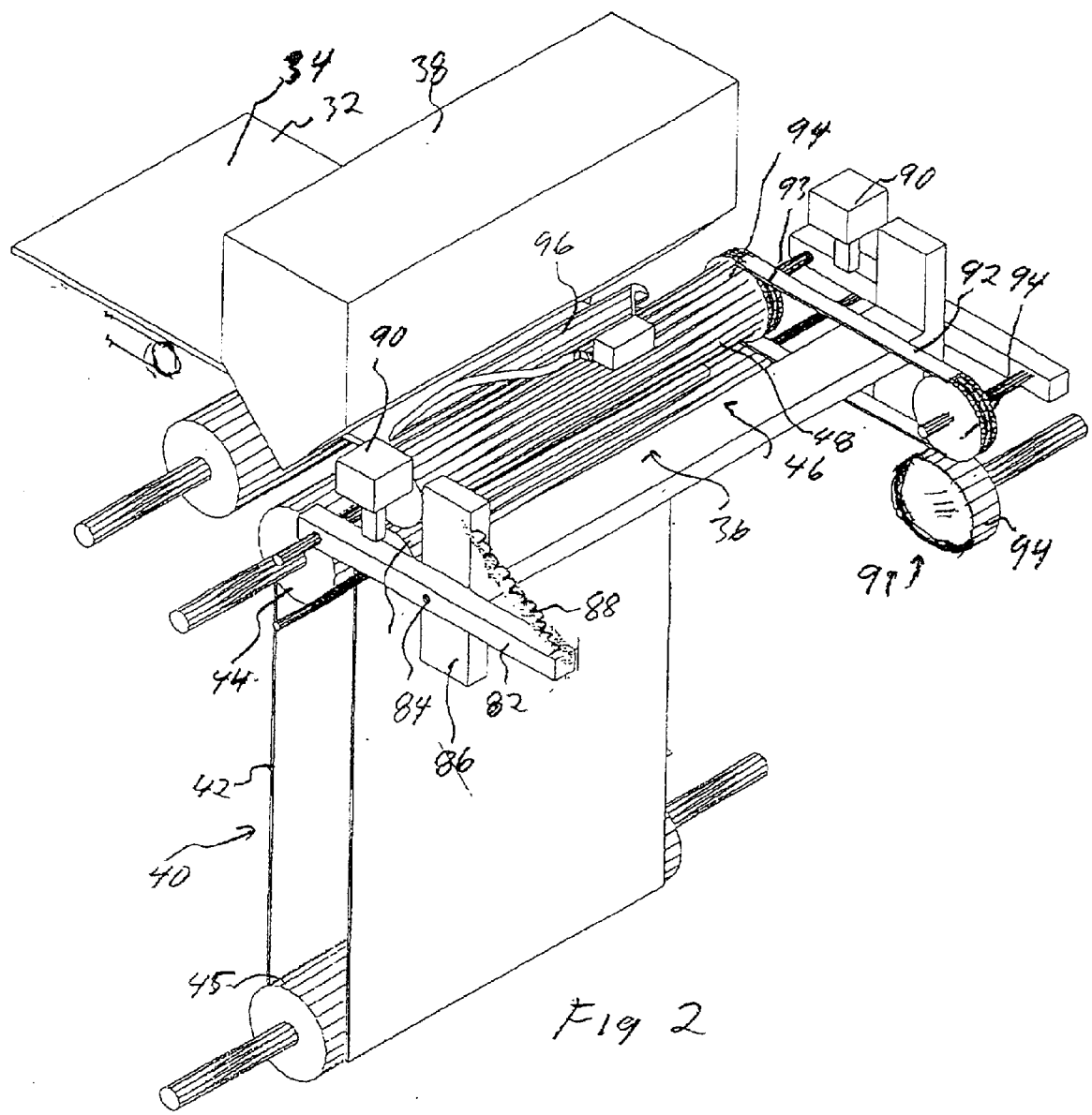
FIG. 2: isometric view showing an apparatus used in the method of the present invention.
Figure 2A:
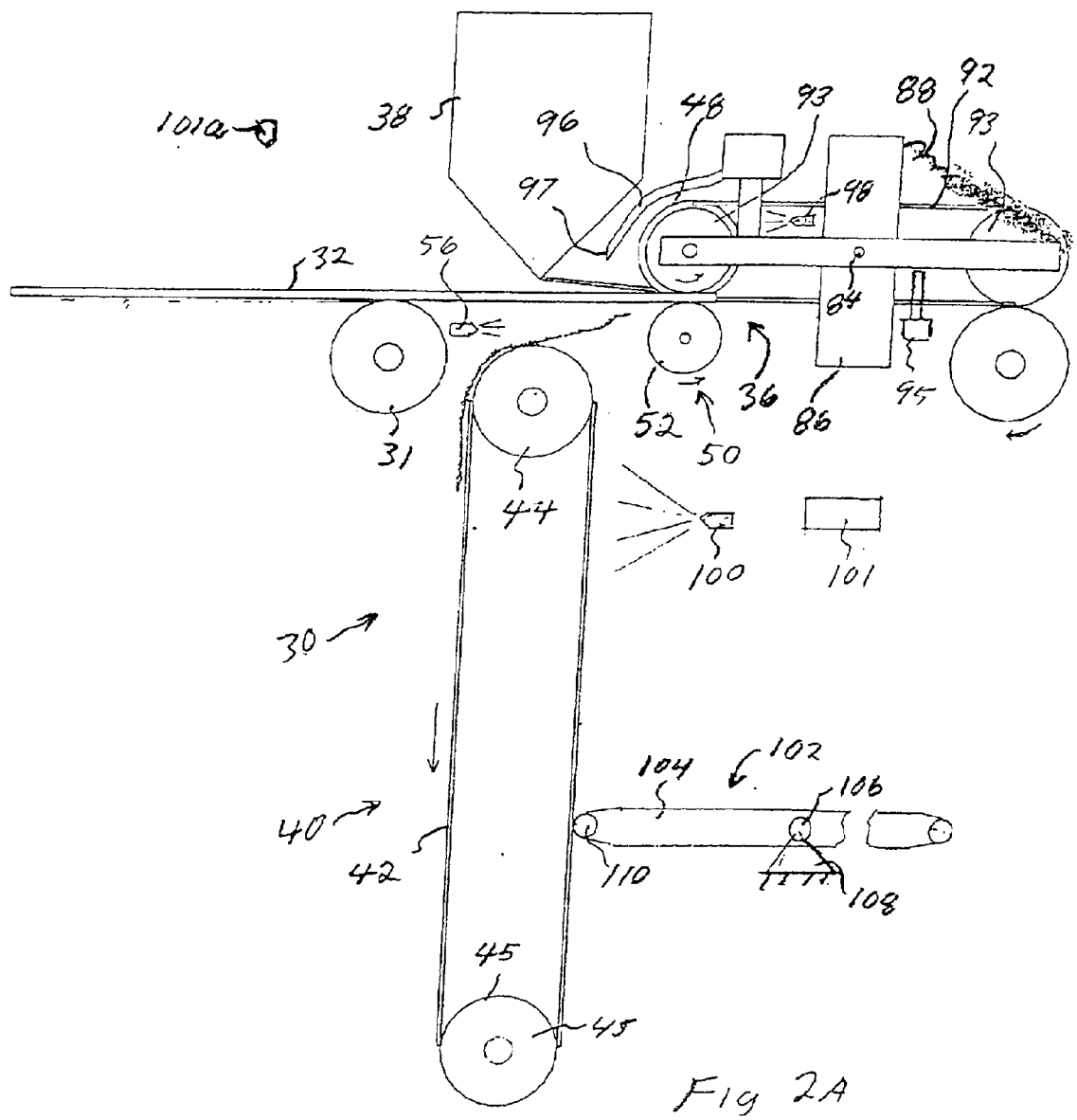
FIG. 2(a): is a side elevational view of the apparatus shown in FIG. 2.

At the lower forward part of the operating location 36, there is a take-up roller section 102 (see FIG. 2A). As indicated previously in this text, if the operation of the apparatus 30 is interrupted, it is desirable to keep the extrusion die apparatus 38 operating. When this occurs, the film 60 that is continuously discharged from the extrusion die apparatus 38 travels downwardly to be in contact with the rearward portion of the belt 42. Rather than simply collect this film in a random fashion in the waste film collector, the take-up roller section 102 is provided to wind this extra film in a roll so that it can conveniently be handled.

This take-up roller section 102 comprises a pair of laterally spaced carrier rods 104 which are rotatably mounted at their center locations to opposite ends of a laterally extending mounting arm 106. The mounting arm 106 is pivotally mounted at its center location to fixed structure, indicated schematically at 108 (See FIG. 2A).

As can be seen in FIGS. 2 and 2A, there are two waste-plastic pickup rollers 110 mounted to the opposite ends of the carrier rods 104 for rotation on the rods 104.

When the leading edge of the excess plastic film 60 moves downwardly past the lower roller 45 of the catch section 40, the leading edge of the film is manually moved upwardly to pass between the rearwardly positioned pickup roller 110 and the adjacent surface of the belt 42. As the leading end is wrapped around the roller 110, the movement of the belt 42 continues to cause the waste-plastic film 60 to be wound around the roller 110.

When a sufficient amount of the film is wound around the rear roller 110, the take-up roller section 102 is rotated 180° about arm 106 to move the rearwardly positioned roller 110 out of contact with the belt 42, and the other roller 110 is moved into position to have the film wound thereon.

It is to be understood that various modifications, additions, or substitutions could be made in the present invention without departing from the basic teaching thereof. Also, the preceding description discloses preferred embodiments and versions of the present invention, and the language of the claims should be interpreted to include such alternatives or modifications within the scope of the language of the claims.

What is claimed is:

1. A method of providing and utilizing pre-painted panels for use in constructing a structure, such as a house, building or other structure, said method comprising:
   a) applying a coat of paint to a paint receiving surface of a plurality of panels, with said coat of paint having a paint surface;
   b) after the paint surface of the coat of paint has become a tack-free surface, but prior to the coat of paint being fully cured, applying to the tack-free surface of the coat of paint, a hot film of a thermoplastic polymetric material;
   c) cooling the film of each panel to cause the film to harden and to adhere to the paint surface of each panel as a protective film;
   d) storing and/or shipping said panels with the protective film adhering to the panels;
   e) removing the protective film, from at least some of the panels;
   f) said method being characterized in that there is provided a condition of gas or vapor permeability for the coat of paint for each panel, said gas or vapor permeability being provided by either providing the panels as a panel which is made of a material which is gas or vapor permeable, or providing the protective film as a film that is a gas or vapor permeable protective film, or by combinations of these, and said panel comprises wood which is gas permeable and the coat of paint on the panel is enabled, at least in part, to cure with gaseous material being able to pass through said panel.

2. A method of providing and utilizing pre-painted panels for use in constructing a structure, such as a house, building or other structure, said method comprising:
   a) applying a coat of paint to a paint receiving surface of a plurality of panels, with said coat of paint having a paint surface;
   b) after the paint surface of the coat of paint has become a tack-free surface, but prior to the coat of paint being fully cured, applying to the tack-free surface of the coat of paint, a hot film of a thermoplastic polymetric material;
   c) cooling the film of each panel to cause the film to harden and to adhere to the paint surface of each panel as a protective film;
   d) storing and/or shipping said panels with the protective film adhering to the panels;
   e) removing the protective film, from at least some of the panels;
   f) said method being characterized in that there is provided a condition of gas or vapor permeability for the coat of paint for each panel, said gas or vapor permeability being provided by either providing the panels as a panel which is made of a material which is gas or vapor permeable, or providing the protective film as a film that is a gas or vapor permeable protective film, or by combinations of these, and each panel is permeable and is made of wood, or wood/cementitious material, or a combination of wood and wood/cementitious material.

3. The method as recited in claim 2, wherein said protective film, after being applied to the panel, is between about one mil to twenty mils in thickness.

4. The method as recited in claim 3, wherein said thickness is between about two to ten mils.

5. The method as recited in claim 3, wherein said protective film is no greater than about 6 mils.

6. The method as recited in claim 2, wherein said protective film that is applied to the panel has adhesion characteristics such that with the protective film having been applied to the paint surface, at a later time when the protective film is to be removed, the protective film has a level of adhesion strength in a range that the adhesion strength is sufficient to enable the protective film to adhere to the paint surface of the coat of paint as a protective layer, and the protective film is able to be peeled from the surface of the coat of paint.

7. The method as recited in claim 6, where said adhesion strength is between about five to fifty Newtons per meter.

8. The method as recited in claim 6, wherein said adhesion strength is between about ten to thirty Newtons per meter.

9. The method as recited in claim 6, wherein the adhesion strength is no greater than about twenty Newtons per meter.

10. The method as recited in claim 6, wherein the protective film has a sufficiently high tensile strength, relative to the adhesion strength of the protective film, so that the protective film can be peeled from the panel in a strip or strips.

11. The method as recited in claim 2, wherein said hot film is applied to the panel by extruding the thermoplastic polymeric material as film, and temperature of the film material being extruded is in a range between about 100° C. to 320° C.

12. The method as recited in claim 11, wherein said temperature range is between about 140° C. to 280° C.

13. The method as recited in claim 11, wherein said temperature range is between about 170° C. to 230° C.

14. The method as recited in claim 2, wherein said thermoplastic polymer material is combined with one or more adhesion promoters to provide the material with adhesion characteristics within a desired range.

15. The method as recited in claim 2, wherein said thermoplastic polymeric material is selected from a group made up of polyolefin resins, low density polyethylene, linear low density polyethylene, metallocene polyethylene, vinylidene chloride/vinylchloride copolymer, polystyrene, and combinations thereof.

16. The method as recited in claim 15, wherein said thermoplastic polymeric material comprises at least in part a polyolefin.

17. The method as recited in claim 2, wherein said thermoplastic polymeric material comprises an adhesion promoter or promoters.

18. The method as recited in claim 2, wherein said thermoplastic polymeric material comprises polyethylene.

19. The method as recited in claim 2, wherein said thermoplastic polymeric material comprises polystyrene.

20. The method as recited in claim 2, wherein said thermoplastic polymeric material comprises vinylidene chloride/vinylchloride.

21. The method as recited in claim 2, wherein said thermoplastic polymeric material comprises polyolefin.

* * * * *